(12) United States Patent
Ouyang

(10) Patent No.: US 8,450,003 B2
(45) Date of Patent: May 28, 2013

(54) BATTERY COVER ASSEMBLY INCLUDING LATCHING MODULE AND PORTABLE ELECTRONIC DEVICE UTILIZING SAME

(75) Inventor: Zhi-Bin Ouyang, Shenzhen (CN)

(73) Assignees: Shenzhen Futaihong Precision Industry Co., Ltd., Shenzhen (CN); FIH (Hong Kong) Limited, Kowloon (HK)

( * ) Notice: Subject to any disclaimer, the term of this patent is extended or adjusted under 35 U.S.C. 154(b) by 365 days.

(21) Appl. No.: 12/843,133

(22) Filed: Jul. 26, 2010

(65) Prior Publication Data
US 2011/0195289 A1 Aug. 11, 2011

(30) Foreign Application Priority Data
Feb. 8, 2010 (CN) .......................... 2010 1 0301332

(51) Int. Cl.
H01M 2/10 (2006.01)
H01M 2/00 (2006.01)

(52) U.S. Cl.
CPC . *H01M 2/00* (2013.01); *H01M 2/10* (2013.01); *H01M 2/1022* (2013.01); *H01M 2/1061* (2013.01); *H01M 2/1066* (2013.01)
USPC .............................................. 429/97; 429/100

(58) Field of Classification Search
CPC ......... H01M 2/00; H01M 2/10; H01M 2/1022; H01M 2/1061; H01M 2/1066
USPC ..................................................... 429/97, 100
See application file for complete search history.

(56) References Cited

U.S. PATENT DOCUMENTS

| 2008/0042448 A1* | 2/2008 | Ge et al. ..................... 292/137 |
| 2010/0020477 A1* | 1/2010 | Chen ......................... 361/679.01 |
| 2010/0130268 A1* | 5/2010 | Huang et al. ............... 455/575.1 |

* cited by examiner

Primary Examiner — Basia Ridley
Assistant Examiner — Sean P Cullen
(74) Attorney, Agent, or Firm — Altis Law Group, Inc.

(57) ABSTRACT

A portable electronic device includes a housing, a battery cover defining a latching hole, a latching element with an elastic section, and an operating lever. The housing defines a cutout. The battery cover includes a hook projecting therefrom and a latching hole defined therein. The hook is received in the cutout. The latching element includes a prong and an elastic section. The elastic section is secured to the housing. The operating lever forces the prong of the latching element to separate from the latching hole and compresses the elastic section.

9 Claims, 7 Drawing Sheets

BATTERY COVER ASSEMBLY INCLUDING LATCHING MODULE AND PORTABLE ELECTRONIC DEVICE UTILIZING SAME

BACKGROUND

1. Technical Field

The disclosure generally relates to battery cover assemblies and, particularly, to a battery cover assembly and a portable electronic device utilizing the assembly.

2. Description of Related Art

Batteries are widely used in portable electronic devices, such as personal digital assistants (PDAs), mobile phones, etc. Often, batteries are attachably received in the electronic device, and battery covers provided to connect with housings of the electronic devices to secure the batteries. Batteries are replaced by opening the battery covers when, for example, the batteries are damaged and/or dead (i.e. no longer rechargeable).

Although battery cover assemblies may be simple, the engagement between the battery cover and the housing of the mobile phone can be too strong to allow easy detachment thereof.

Therefore, there is room for improvement within the art.

BRIEF DESCRIPTION OF THE DRAWINGS

Many aspects of the exemplary battery cover assembly can be better understood with reference to the following drawings. The components in the drawings are not necessarily drawn to scale, the emphasis instead being placed upon clearly illustrating the principles of the battery cover assembly. Moreover, in the drawings, like reference numerals designate corresponding parts throughout the several views, in which.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
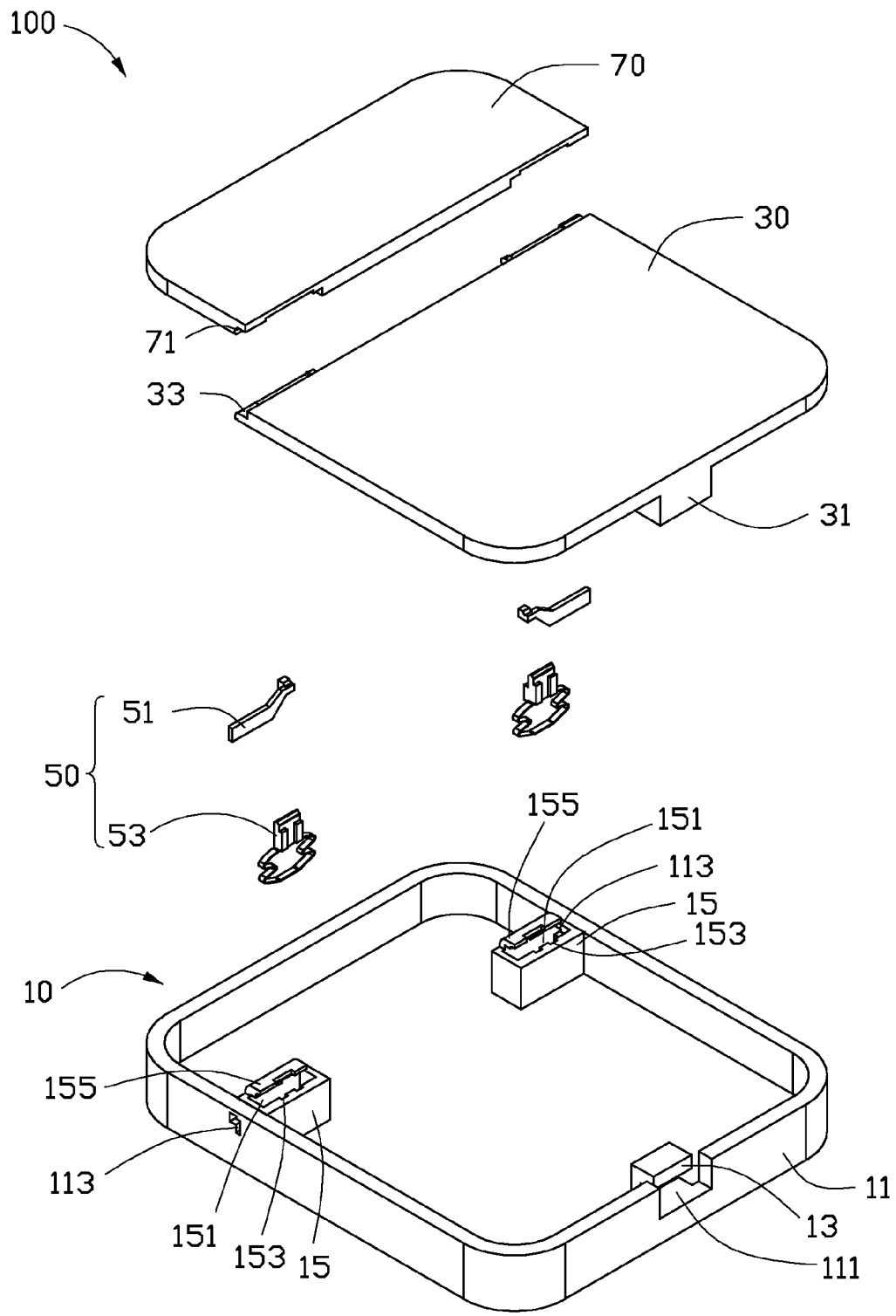
FIG. 1 is an exploded, isometric view of an exemplary embodiment of a battery cover assembly for portable electronic device.

FIG. 1 is an exemplary embodiment of a battery cover assembly 100 for a portable electronic device, such as a cellular phone or other electronic device where a detachable battery cover is needed. The battery cover assembly 100 includes a housing 10, a battery cover 30, two latching modules 50, and a plate 70. Each latching module 50 includes an operating lever 51 and a latching element 53. The operating lever 51 is slidably attached to the housing 10 to unlock the battery cover 30 by pressing against the latching element 53. The latching element 53 is movably attached to the housing 10 to secure the battery cover 30 to the housing 10. The operating lever 51 slides in a first direction, while the latching element 53 slides in a second direction perpendicularly to the first direction, and presses against the operating lever 51 to unlock the battery cover 30. The plate 70 is for supporting the battery cover 30.

The housing 10 includes a plurality of sidewalls 11. One of the sidewalls defines a cutout 111 at one end of the housing 10. Opposite side walls 11, each substantially perpendicular to the end of the housing defining cutout 111 define a through holes 113. A catch 13 projects perpendicularly from the housing 10 and faces the cutout 111 for securing the battery cover 30. A block 15 extends from opposite inner surfaces of the opposite sidewalls 11 to secure the corresponding latching modules 50. Each block 15 defines a cavity 151 therein and two spaced slots 153 in one inside surface. Each cavity 151 communicates with the corresponding through hole 113. A protrusion 155 extends from of the block 15 and over the cavity 151.

Figure 2:
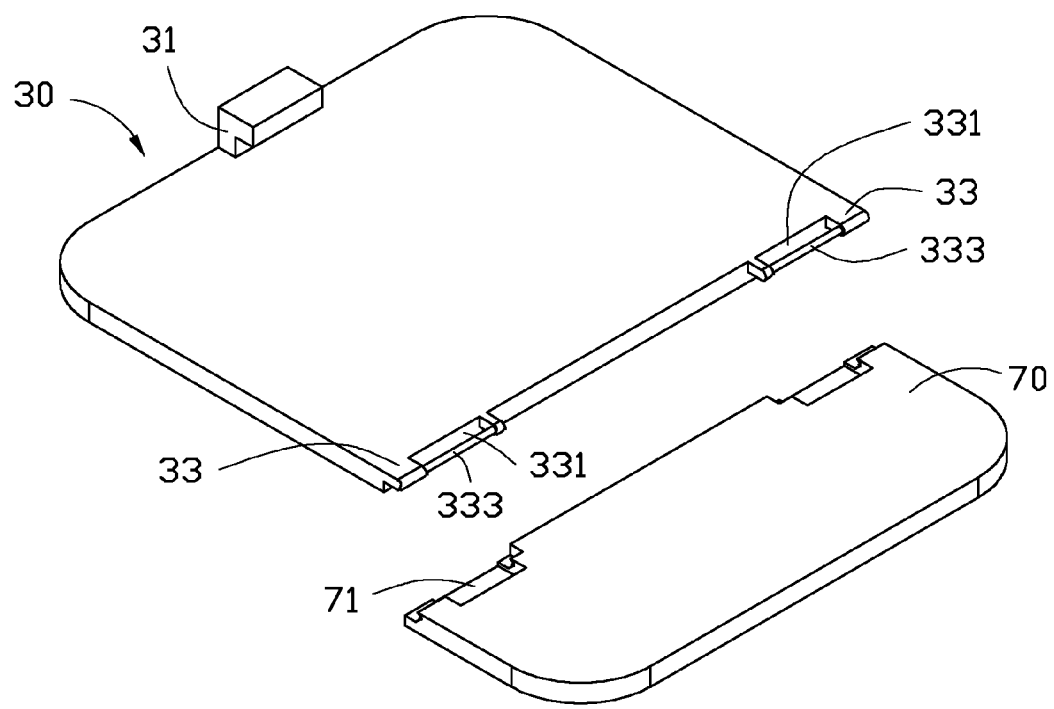
FIG. 2 is an isometric view of the battery cover and a plate of FIG. 1 from another aspect.

Referring to FIG. 2, a hook 31 projects from one end of the battery cover 30 and two latching portions 33 extend from the other end of the battery cover 30. The hook 31 is for being received in the cutout 111 and latching with the catch 13 to secure the battery cover 30 to the housing 10. Each latching portion 33 defines a latching hole 331 and forms a shaft 333. Two stepped positioning slots 71 are defined in one end of the plate 70 to receive the latching portions 33 of the battery cover 30.

Figure 3:
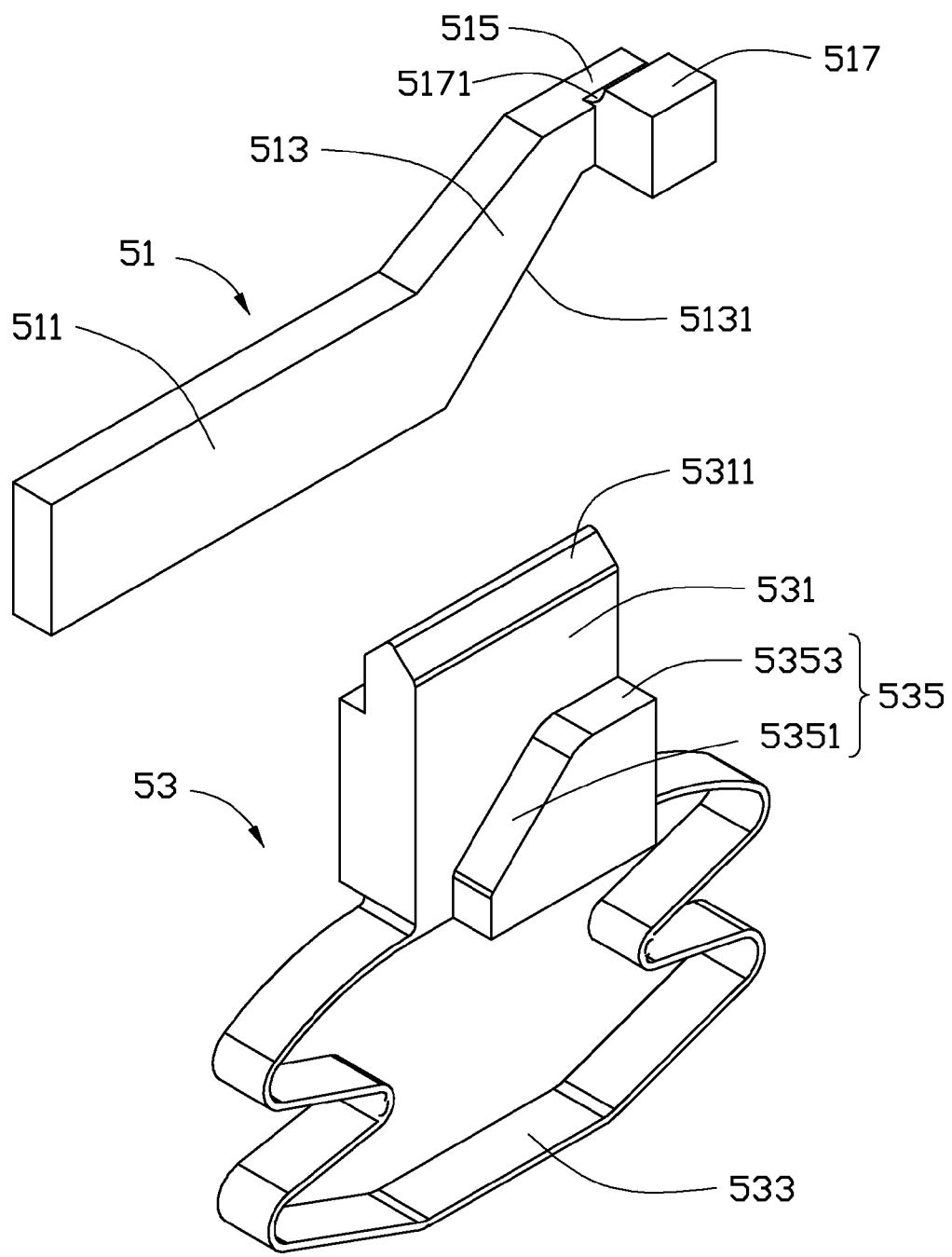
FIG. 3 is an enlarged view of a latching module of the battery cover assembly.
Figure 4:
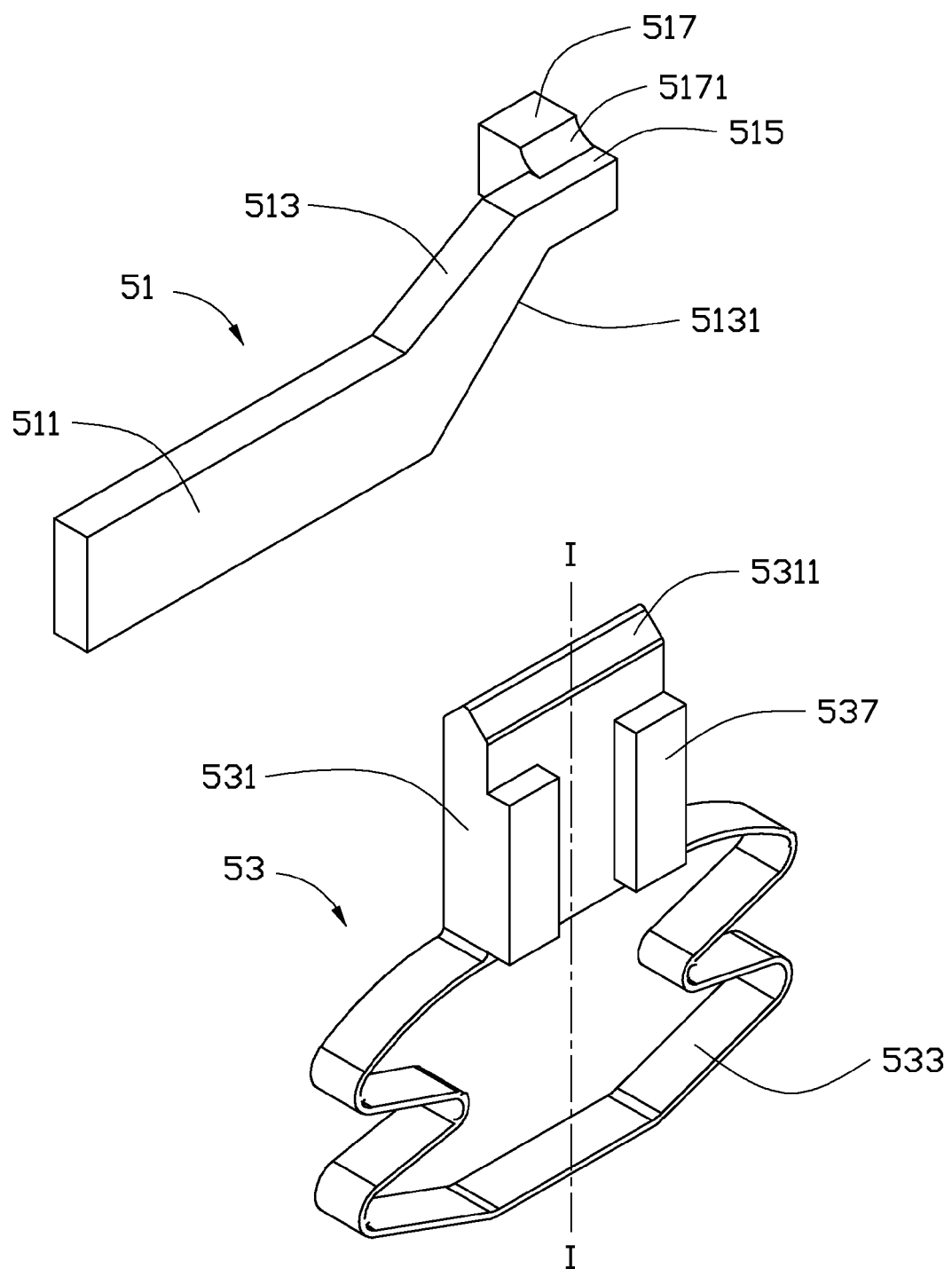
FIG. 4 is similar to FIG. 3, but viewed from another aspect.

Referring to FIGS. 3 and 4, each operating lever 51 includes a beam 511, a resisting portion 513, and a guiding portion 515 substantially parallel to the beam 511. The beam 511 is slidably received in the cavity 151 and one end of the beam 511 extends out of the corresponding through hole 113 of the housing 10. One end of he resisting portion 513 is oriented at an angle with the beam 511, and includes a resisting surface 5131. The guiding portion 515 is connected with the other end of the resisting portion 513. A resisting block 517 with a curve engaging surface 5171 extends from one side of the guiding portion 515 to guide the operating lever 51 to slide along the housing 10 when the operating lever 51 is pressed or released.

The latching element 53 includes a main section 531 and an elastic section 533 integrally formed with the main section 531 through plastic injection molding or punching for example. A prong 5311 is formed at the end of the main section 531 opposite to the elastic section 533 to be received in the corresponding latching hole 331. A resisting protrusion 535 projects from one surface of the main section 531 and two spaced guiding projections 537 project from the other surface of the main section 531. The resisting protrusion 535 includes a retaining surface 5351 and a guiding surface 5353 formed at an obtuse angle with the retaining surface 5351. Each guiding projection 537 is slidably received in the corresponding slot 153 of block 15. The elastic section 533 is substantially symmetric arranged along I-I line, having a shape of two approximate w-shaped portions facing each other, as shown in FIG. 4. Each w-shaped section includes an upper leg connecting to the beam 531 and a lower leg connecting to the lower leg of the other elastic section 533. The middle portion of the w-shaped portion can flex to reduce energy when compressed and alleviate impact during use.

Figure 5:
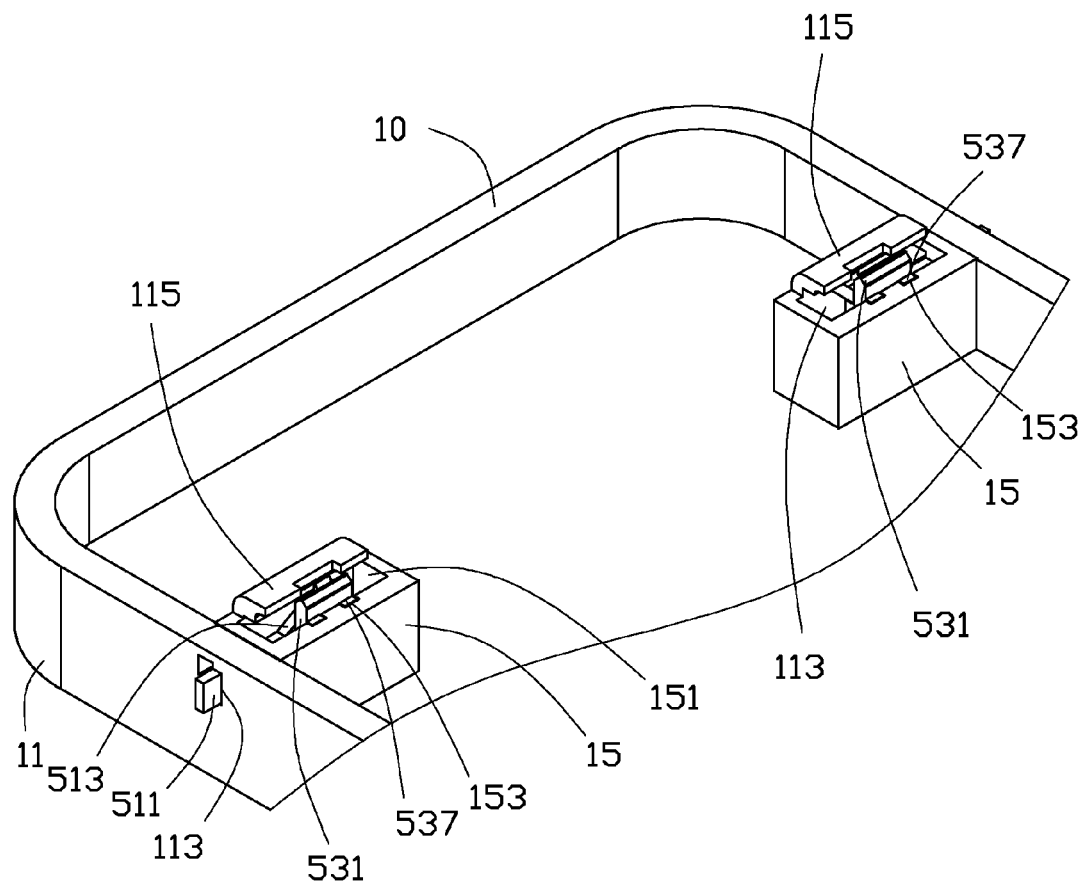
FIG. 5 is an enlarged view showing the latching module attached to the housing.
Figure 6:
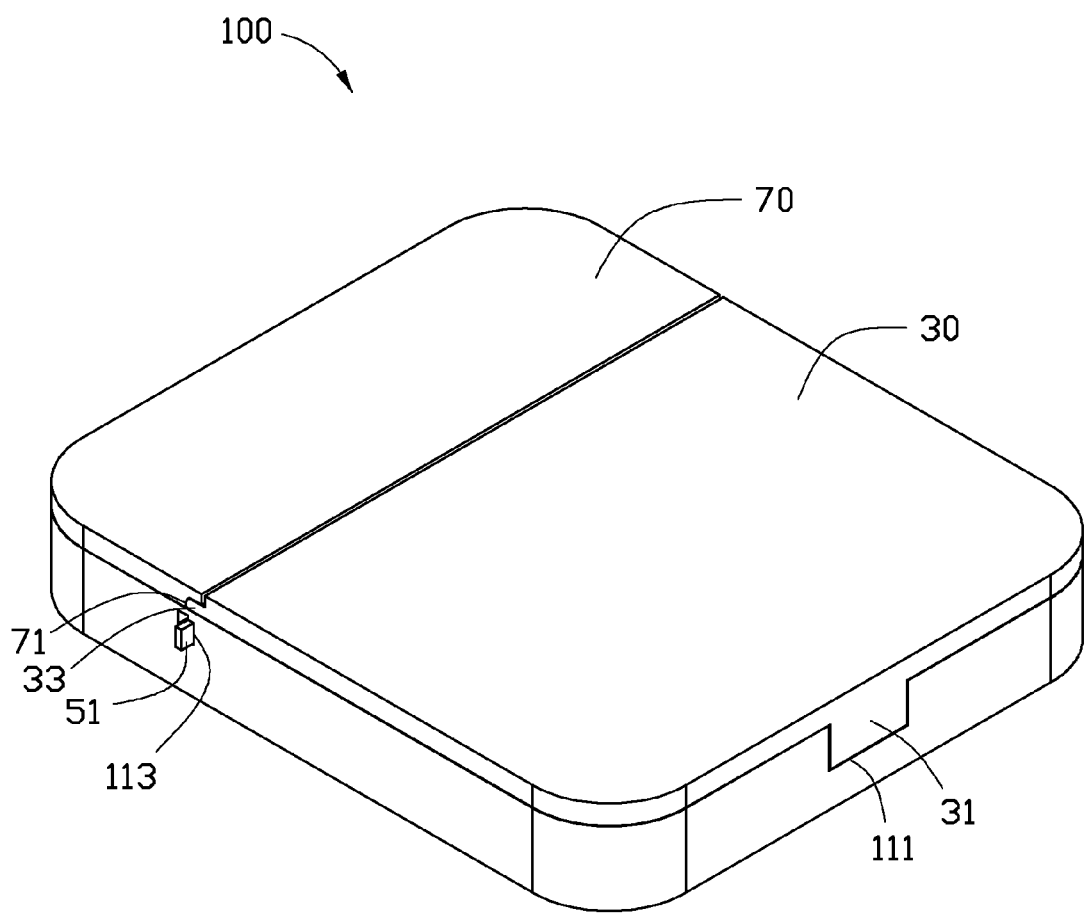
FIG. 6 is an assembled view of the portable electronic device.
Figure 7:
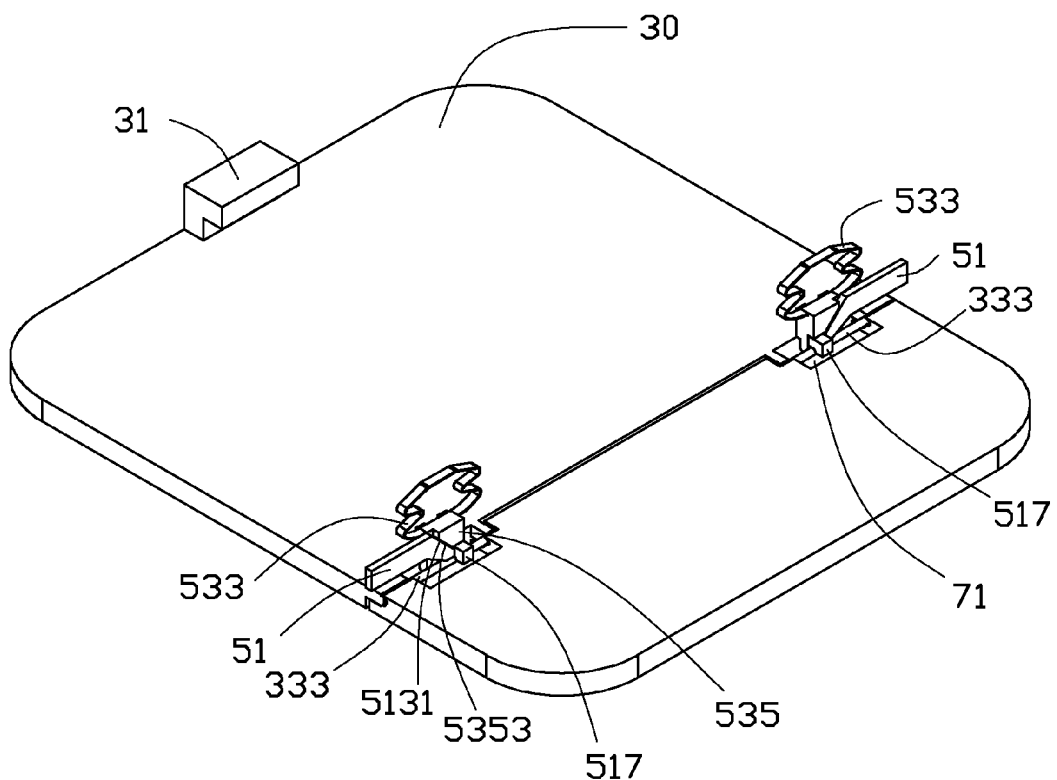
FIG. 7 is an isometric view showing the latching module securing the battery cover.

Referring to FIGS. 5 through 7, during assembly, first, the two latching modules 50 are secured to the housing 10. Each latching element 53 is slidably received in the cavity 151. Each guiding projection 537 is slidably received in the corresponding slot 153 to guide the main section 531 when the latching element 53 slides relative to the housing 10. Each operating lever 51 is inserted into the cavity 151, with the beam 511 passing through the corresponding through hole 113 and the resisting surface 5131 slidably resisting the corresponding guiding surface 5353. When the latching module 50 is secured to the housing 10, the lower legs of the elastic section 533 resists the bottom surface of the cavity 151.

Then, for example, the plate 70 is placed on the housing 10 and is fixed to the housing 10 by means of hot-melting, sonic welding or laser welding. When the plate 70 is attached to the housing 10, each protrusion 155 is received in the corresponding stepped positioning slot 71. Then, the battery cover 30 is slidably attached to the housing 10. The battery cover 30 is placed on the housing 10 and is pushed to move toward the plate 70 by the user. Each prong 5311 of the main section 531 reaches into the corresponding latching hole 331 by the corresponding elastic force of the elastic section 533. And the hook 31 is received in the cutout 111 and latches with the catch 113. Thus, the movement of the battery cover 30 is limited. Thus, the battery cover assembly 100 is assembled. When the battery cover 30 is secured to the housing 10, one end of each beam 511 passes through the corresponding through hole 113 and extends out of the sidewall 11. And each engaging surface 5171 slidably resists the corresponding shaft 333.

When a battery is to be replaced or installed, the exposed portion of the beam 511 are pressed by the user and are received in the housing 10, each resisting block 517 slides along the corresponding shaft 333. When the operating lever 51 slides, the resisting surface 5131 resists the guiding surface 5353 to impel the corresponding latching element 53 to move away from the battery cover 30 until the prong 5311 separate from the corresponding latching hole 331, with the elastic section 533 being compressed and accumulating potential energy. Thus, the battery cover 30 can be removed from the housing 10. Each operating lever 51 retracts by the elastic force of the elastic section 533 on releasing.

The battery cover assembly 100 includes a latching element 53 with an elastic section 533 and an operating lever 51, the elastic section 533 is compressed and the latching element 53 separates from the battery cover 30 by pressing the operating lever 51, thus, the battery cover assembly 100 is easy to use. Furthermore, the elastic section 533 includes two w-shaped portions facing each other, (see FIGS. 3 and 4), thus, it can reduce the impact to the housing 10 and battery cover 30.

It is to be understood that the number of latching module 50 can be one or more. Furthermore, the positioning element 70 may be integrally formed within the housing 10 by plastic injection molding.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being preferred or exemplary embodiments of the disclosure.

What is claimed is:

1. A battery cover assembly comprising:
   a housing defining a cutout;
   a battery cover including a hook projecting therefrom and a latching portion, the hook received in the cutout, the latching portion defining a latching hole and including a shaft adjacent to the latching hole;
   a latching element including a main section and an elastic section integrally formed together, a prong formed at one end of the main section, the prong received in the latching hole, the elastic section secured to the housing; and
   an operating lever including a beam, a resisting portion and a resisting block integrally formed together, the resisting block including a curve engaging surface, the beam is pressed toward the housing, the curve engaging surface of the resisting block sliding along the shaft to guide the operating lever, the resisting portion abutting the latching element for forcing the prong of the latching element to separate from the latching hole and compressing the elastic section.

2. The battery cover assembly as claimed in claim 1, wherein the elastic section includes a shape of two w-shaped portions facing each other.

3. The battery cover assembly as claimed in claim 1, wherein a block with a cavity therein is formed on the housing, a through hole is defined in the housing and communicates with the cavity,
   the latching element and the operating lever are received in the cavity,
   and the beam of the operating lever passes through the through hole and extends out of the housing.

4. The battery cover assembly as claimed in claim 3, wherein a guiding projection projects from one surface of the main section,
   the block further defines a slot, in which the guiding projection is slidably received.

5. The battery cover assembly as claimed in claim 4, wherein a resisting protrusion with a retaining surface projects from another surface of the main section,
   the operating lever includes a guiding portion parallel to the beam and connected to the resisting portion, and the resisting portion includes a resisting surface and the resisting surface presses the retaining surface.

6. A portable electronic device comprising:
   a housing;
   a battery cover defining a latching portion, the latching portion defining a latching hole and including a shaft adjacent to the latching hole;
   a latching element being slidably secured to the housing, the latching element including a main section and an elastic section, a prong formed at one end of the main section, the prong received in the latching hole;
   an operating lever including a beam, a resisting portion and a resisting block integrally formed together, the resisting block including a curve engaging surface, the beam is pressed toward the housing, the curve engaging surface of the resisting block sliding along the shaft to guide the operating lever, the resisting portion abutting the latching element for separating the latching element from the battery cover and compressing the elastic section when pressed or sliding along the housing.

7. The portable electronic device as claimed in claim 6, wherein the elastic section includes a shape of two w-shaped portions facing each other.

8. The portable electronic device as claimed in claim 6, wherein a block with a cavity therein is formed on the housing, a through hole communicating with the cavity is defined in the housing,
   the latching element and the operating lever are slidably received in the cavity, and the beam of the operating lever passes through the through hole and extends out of the housing.

9. The portable electronic device as claimed in claim 8, wherein a guiding projection projects from one surface of the main section, the block further defines a slot, in which the guiding projection is slidably received.

* * * * *